United States Patent
Ichinohe et al.

(10) Patent No.: US 6,370,653 B1
(45) Date of Patent: Apr. 9, 2002

(54) INTERNETWORK ROUTE CALCULATION EXECUTION METHOD AND APPARATUS

(75) Inventors: Shinya Ichinohe, Ebina; Shigeki Morimoto, Atsugi; Norihide Noyama, Hadano; Takunori Yoneno, Yokohama, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/199,200

(22) Filed: Nov. 25, 1998

(30) Foreign Application Priority Data

Nov. 28, 1997 (JP) ............................................. 9-327294

(51) Int. Cl.[7] ................................................ G06F 11/20
(52) U.S. Cl. ............................. 714/4; 714/43; 709/223; 709/238; 370/242
(58) Field of Search ....................... 714/4, 43; 709/223, 709/238, 240, 224, 239, 249; 370/355, 356, 216, 218, 226, 242, 243–244, 245

(56) References Cited

U.S. PATENT DOCUMENTS

| | | | | |
|---|---|---|---|---|
| 6,032,266 A | * | 2/2000 | Ichinohe et al. | 714/9 |
| 6,034,961 A | * | 3/2000 | Masuo et al. | 370/395 |
| 6,049,524 A | * | 4/2000 | Fukushima et al. | 370/220 |
| 6,092,214 A | * | 7/2000 | Quoc et al. | 714/4 |
| 6,148,411 A | * | 11/2000 | Ichinohe et al. | 714/4 |

FOREIGN PATENT DOCUMENTS

JP      3-78339      4/1991

* cited by examiner

*Primary Examiner*—Scott T. Baderman
(74) *Attorney, Agent, or Firm*—Mattingly, Stanger & Malur, P.C.

(57) ABSTRACT

In an internetwork apparatus for interconnecting a plurality of networks having a route calculating module for calculating routes and a management module for managing a whole operation of the internetwork apparatus, the management module substitutes for route calculation in place of the route calculating module, when a fault occurs in the route calculating module, and packets are repeated in accordance with route calculation results made by the management module.

17 Claims, 12 Drawing Sheets

CONTENTS OF ROUTING TABLE 202 DURING NORMAL OPERATION 202

| ENTRY NUMBER | DESTINATION | NEXT HOP | FLAG | REMARK |
|---|---|---|---|---|
| 1 | NETWORK 3002 | a | 1 | RIP,OSPF |
| 2 | NETWORK 3003 | b | 1 | RIP |
| 3 | NETWORK 4002 | c | 1 | RIP,OSPF |
| 4 | NETWORK 4003 | d | 1 | OSPF |
| ⋮ | ⋮ | ⋮ | ⋮ | ⋮ |
| 1500 | NETWORK 11500 | c | 1 | RIP,OSPF |
| 1501 | NETWORK 11501 | c | 1 | RIP,OSPF |
| ⋮ | ⋮ | ⋮ | ⋮ | ⋮ |
| 3000 | NETWORK 13000 | a | 1 | RIP,OSPF |

3010   3020   3030   3040   3050

CONTENTS OF ROUTING TABLE 112 DURING DEGENERATION OPERATION LIMITING OSPF  112

| ENTRY NUMBER | DESTINATION | NEXT HOP | FLAG | REMARK |
|---|---|---|---|---|
| 1 | NETWORK 3002 | a | 1 | RIP |
| 2 | NETWORK 3003 | b | 1 | RIP |
| 3 | NETWORK 4002 | c | 1 | RIP |
| 4 | NETWORK 4003 | d | 0 | INVALID ENTRY |
| ⋮ | ⋮ | ⋮ | ⋮ | ⋮ |
| 1500 | NETWORK 11500 | c | 1 | RIP |
| 1501 | NETWORK 11501 | c | 1 | RIP |
| ⋮ | ⋮ | ⋮ | ⋮ | ⋮ |
| 3000 | NETWORK 13000 | a | 1 | RIP |

4040  4050

CONTENTS OF ROUTING TABLE 112 DURING DEGENERATION OPERATION LIMITING PORT 402

112

| ENTRY NUMBER | DESTINATION | NEXT HOP | FLAG | REMARK |
|---|---|---|---|---|
| 1 | NETWORK 3002 | a | 1 | RIP,OSPF |
| 2 | NETWORK 3003 | b | 1 | RIP |
| 3 | NETWORK 4002 | c | 0 | INVALID ENTRY |
| 4 | NETWORK 4003 | d | 1 | OSPF |
| ⋮ | ⋮ | ⋮ | ⋮ | ⋮ |
| 1500 | NETWORK 11500 | c | 0 | INVALID ENTRY |
| 1501 | NETWORK 11501 | c | 0 | INVALID ENTRY |
| ⋮ | ⋮ | ⋮ | ⋮ | ⋮ |
| 3000 | NETWORK 13000 | a | 1 | RIP,OSPF |

6030

CONTENTS OF ROUTING TABLE 112 DURING
DEGENERATION OPERATION LIMITING NUMBER OF RNTRY  112

| ENTRY NUMBER | DESTINATION | NEXT HOP | FLAG | REMARK |
|---|---|---|---|---|
| 1 | NETWORK 3002 | a | 1 | RIP,OSPF |
| 2 | NETWORK 3003 | b | 1 | RIP |
| 3 | NETWORK 4002 | c | 1 | RIP,OSPF |
| 4 | NETWORK 4003 | d | 1 | OSPF |
| ⋮ | ⋮ | ⋮ | ⋮ | ⋮ |
| 1500 | NETWORK 11500 | c | 1 | RIP,OSPF |

DELETION

INTERNETWORK ROUTE CALCULATION EXECUTION METHOD AND APPARATUS

BACKGROUND OF THE INVENTION

The present invention relates to an internet-work apparatus for connecting a plurality of networks at a network layer level, and more particularly to techniques effective for application to an internetwork apparatus which continues an operation of connecting a plurality of networks by performing a degeneration process when a fault occurs.

In a system in which one internetwork apparatus connects a plurality of networks, if a fault occurs in the internetwork apparatus, a protocol process between networks becomes impossible so that communication between networks stops and the operation of the whole system may stop.

In such a case, if two internetwork apparatuses are used for configuring a redundancy system and the current system and standby system of the internet-work apparatuses are switched, a high reliability system can be provided.

As techniques of running a system by switching between two internetwork apparatuses, there is known as disclosed, for example, in JP-A-3-78339, a redundancy system in which when a fault occurs in the current system, the whole system is switched to the standby system.

Since the conventional redundancy system uses two current and standby internetwork apparatuses, it becomes necessary to add a standby internetwork apparatus to a current internetwork apparatus so that the system cost becomes high.

SUMMARY OF THE INVENTION

It is an object of the present invention to solve the above problem and provide techniques capable of performing routing even when a fault occurs in a route calculating module without adding a new system.

It is another object of the present invention to provide techniques capable of reducing a process load of a management module which substitutes for the function of a route calculating module.

According to the present invention, in an internetwork apparatus interconnecting a plurality of networks, a management module performs routing by substituting for the function of a route calculating module when a fault occurs in the route calculating module.

During a normal operation of the internetwork apparatus of this invention, the route calculating module forms a first routing table through the operation of a first routing protocol process unit. In accordance with the first routing table of the route calculating module, a repeating process or relay module determines a repeating destination of each packet.

A fault detecting process unit of the management module enquires the operation state of the route calculating module and checks its response to judge whether any fault occurs in the route calculating module.

When a fault is detected in the route calculating module, the management module activates a second routing protocol process unit of the management module and forms a second routing table of the management module through the operation of the second routing protocol process unit.

Next, a routing table reference destination change notice process unit notifies the repeating process module of a routing table reference destination change notice which indicates that the routing table to be referred to by the repeating process module when the repeating process module repeats a packet, was changed from the first routing table of the route calculating module to the second routing table of the management module.

A routing table reference destination change notice reception unit of the repeating process module receives the routing table reference destination change notice notified by the management module, and changes the routing table to be referred to by the repeating process module when the repeating process module repeats a packet, from the first routing table of the route calculating module to the second routing table of the management module. In accordance with the second routing table of the management module, the repeating process module determines a repeating destination of each packet and transmits the packet.

The cost of a high reliability redundancy system using a plurality of internetwork apparatuses is high. However, the internetwork apparatus of this invention described above can realize a high reliability system at a low cost because the management module substitutes for the function of the route calculating module.

As above, according to the internetwork apparatus of this invention, since the management module substitutes for the function of the route calculating module when a fault occurs in the route calculating module, it is possible to perform routing even if a fault occurs in the route calculating module, without adding a new system.

Further, according to an embodiment of the internetwork apparatus, since the contents of a substitute process to be executed by the management module when a fault occurs in the route calculating module, are limited, the process load of the management module which substitutes for the function of the route calculating module can be reduced.

DETAILED DESCRIPTION OF THE PREFERRED EMBODIMENTS

An internetwork apparatus according to an embodiment of the invention will be described. In this embodiment, a management module of the internetwork apparatus provides a substitute function for a route calculating module when a fault occurs in the route calculating module.

Figure 1:
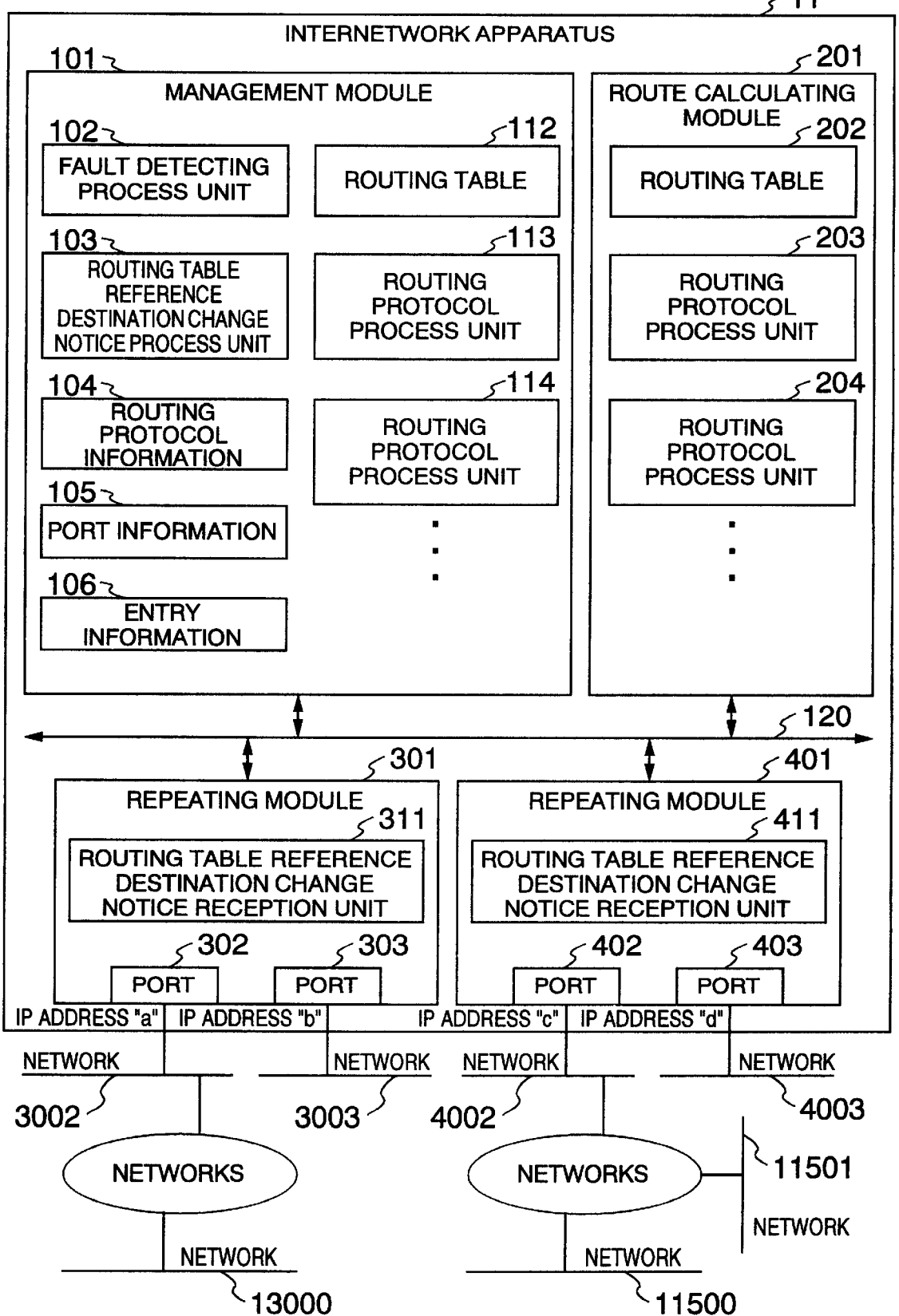
FIG. 1 is a diagram showing the outline structure of an internetwork apparatus according to an embodiment of the invention.

FIG. 1 is a diagram showing the outline structure of an internetwork apparatus 11 of the embodiment. The internetwork apparatus 11 is called also a router which is a computer node for determining a route of data (packet) transmitting over a plurality of networks. As shown in FIG. 1, the internetwork apparatus has a management module 101, a route calculating module 201, and repeating process modules 301 and 401.

The management module 101 manages the whole operation of the internetwork apparatus 11 and provides a substitute function for the route calculating module 201 when a fault occurs in the route calculating module 201. The management module 101 is provided in the form of a board on which processors, memories, and other LSI are mounted.

The route calculating module 201 determines an optimum repeating route by calculating various routes via which a packet is transmitted over networks, and is provided in the form of a board on which processors, memories, and other LSI are mounted. The repeating modules 301 and 401 repeat packets during a normal operation in accordance with a routing table 202, and during a fault occurrence of the route calculating module 201 in accordance with a routing table 112. The repeating modules 301 and 401 are provided in the form of a board on which processors, memories, and other LSI are mounted. Reference numeral 120 represents an internal bus of the internetwork apparatus 11 for interconnecting the management module 101, route calculating module 201, and repeating modules 301 and 401.

The management module 101 has a fault detecting process unit 102, a routing table reference destination change notice process unit 103, and routing protocol process units 113 and 114. A process unit for performing a management process essential to the management module 101 is not directly relevant to the present invention and is not shown.

The fault detecting process unit 102 detects a fault in the route calculating module 201. The routing table reference destination change notice process unit 103 notifies the repeating modules 301 and 401 of a routing table reference destination change notice which indicates that a routing table to be referred to when a repeating destination of a packet is determined, was changed. The routing protocol process units 113 and 114 are second protocol process units which form (update) the routing table 112 by calculating routes in accordance with routing information which is transmitted from another rooter when a fault occurs in the route calculating module 201 and writing an optimum repeating route in the routing table 112. The routing protocol process units 113 and 114 are provided as many as the number of protocols such as RIP, OSPF and the like to be described later.

A program for running the fault detecting process unit 102, routing table reference destination change notice process unit 103, and routing protocol process units 113 and 114, respectively of the management module 101, is assumed to be stored in a storage medium such as an IC memory.

The management module 101 also has routing protocol information 104, port information 105, entry information 106, and the routing table 112.

The routing protocol information 104 indicates a routing protocol process which is executed when the management module 101 provides a substitute function for the route calculating module 201. The port information 105 indicates a port which is used when the management module 101 provides a substitute function for the route calculating module 201.

The entry information 106 indicates an entry number of the routing table 112 which is used when the management module 101 provides a substitute function for the route calculating module 201. The routing table 112 is a second table which stores route information obtained by the routing protocol process units 113 and 114.

The route calculating module 201 has routing protocol process units 203 and 204. The routing protocol process units 203 and 204 are first protocol process units which update the routing table 202 by calculating routes in accordance with routing information which is transmitted from another rooter during a normal operation and writing an optimum repeating route in the routing table 202. Similar to the first protocol process units, the first routing protocol process units 203 and 204 are provided as many as the number of protocols.

A program for running the routing protocol process units 203 and 204 of the route calculating module 201 is assumed to be stored in a storage medium such as an IC memory.

The routing table 202 of the route calculating module 201 is a first table for storing route information obtained by the routing protocol process units 203 and 204.

The repeating module 301 has a routing table reference destination change notice reception unit 311 which receives a routing table reference destination change notice from the routing table reference destination change notice process unit 103 and changes the table to be referred to when a repeating destination of a packet is determined. A process unit for executing a repeating process essential to the repeating module 301 is not directly relevant to the present invention and is not shown.

A program for running the routing table reference destination change notice reception unit 411 of the repeating process module 301 is assumed to be stored in a storage medium such as an IC memory.

The repeating module 301 has also communication ports 302 and 303. The communication port 302 is connected to a network 3002 by using an IP address "a". The communication port 303 is connected to a network 3003 by using an IP address "b".

The repeating module 401 has a routing table reference destination change notice reception unit 411 which receives a routing table reference destination change notice from the routing table reference destination change notice process unit 103 and changes the table to be referred to when a repeating destination of a packet is to be determined. A process unit for executing a repeating process essential to the repeating module 401 is not directly relevant to the present invention and is not shown.

A program for running the routing table reference destination change notice reception unit 411 of the repeating process module 401 is assumed to be stored in a storage medium such as an IC memory.

The repeating module 401 has also communication ports 402 and 403. The communication port 402 is connected to a network 4002 by using an IP address "c". The communication port 403 is connected to a network 4003 by using an IP address "d".

The networks 3002, 3003, 4002, 4003 and networks 13000, 11500, and 11501 constitute communition lines for transmitting packets repeated by the nternetwork apparatus 11.

Routing protocols are IP (Internet Protocol), acket processing RIP (Routing Information Protocol) and SPF (Open Shortest Path First), IPX (Internet Packet xchange) packet processing IPX-RIP and NLSP (NetWare ink Service Protocol), AppleTalk packet processing RTMP (Routing Table Maintenance Protocol), and the like.

In the description of the internetwork apparatus 11 of this embodiment, it is assumed that a protocol processed by the routing protocol process units 113 and 203 is RIP and a protocol processed by the routing protocol process units 114 and 204 is OSPF.

Also in the following description, it is assumed that the maximum number of entries of the routing tables 112 and 202 is 3000 entries and the number of entries in the normal operation is 3000 entries.

Also in the following description, it is assumed that the routing protocol process units 113 and 114 are inactive during the normal operation. However, the routing protocol process units 113 and 114 may be made active during the normal operation in order to shorten a switching time to the routing table 112 when a fault occurs in the route calculating module 201.

In the following, a description will be given for an operation of the management module 101 of the internetwork apparatus 11 of this embodiment, the management module providing a substitute function for the route calculating module 201 when a fault occurs in the route calculating module.

Figures 2, 3:
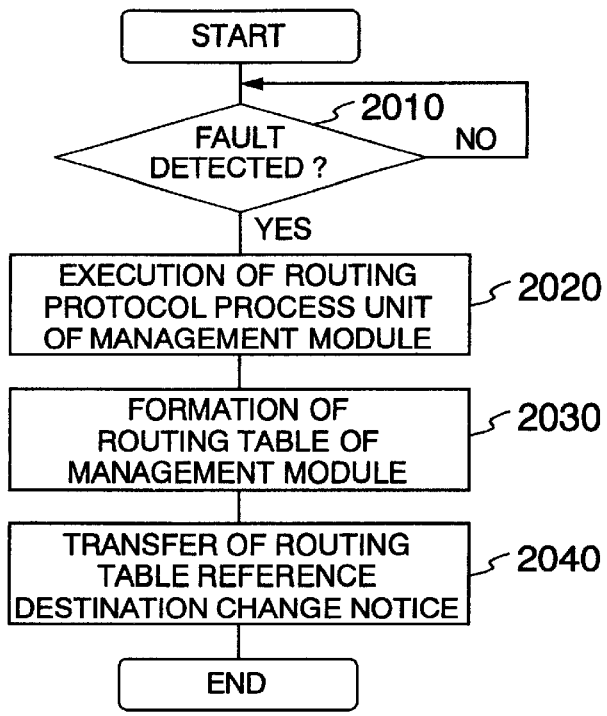
FIG. 2 is a flow chart illustrating a process to be executed by the internetwork apparatus shown in FIG. 1.
FIG. 3 shows an example of a routing table 202 during a normal operation according to the embodiment shown in FIG. 1.

FIG. 2 is a flow chart illustrating the processes to be executed by the internetwork apparatus 11 of the embodiment. During the normal operation of the internetwork apparatus of the embodiment, the repeating modules 301 and 401 repeat packets in accordance with the routing table 202.

When a fault occurs in the route calculating module 201, the repeating modules 301 and 401 cannot refer to the routing table 202 so that packets cannot be repeated and communication halts.

At Step 2010, the fault detecting process unit 102 of the management module 101 enquires the operation state of the route calculating module 201 and checks its response to judge whether any fault occurs, as one of operation checks of each module in the internetwork apparatus 11.

The route calculating module 201 may be provided with a function of detecting its own fault to periodically notify the management module 101 of a presence/absence of a fault.

If a fault of the route calculating module 201 is detected at Step 2010, then at Step 2020 the management module 101 activates the routing protocol process units 113 and 114.

At Step 2030 the management module 101 forms the routing table 112 with the help of the operations by the routing protocol process units 113 and 114.

The contents of the routing table 112 may be the contents of the routing table 202 of the route calculating module 201 copied by the management module 101 via the internal bus 120, may be all newly generated, or may be partially newly generated and partially copied. It takes a relatively short time for the management module 101 to newly form all the entries of the routing table 112, by collecting routing information from another router.

Next, at Step 2040 the routing table reference destination change notice process unit 103 notifies the repeating process modules 301 and 401 of a routing table reference destination change notice which indicates that the table to be referred to when the repeating process modules 301 and 401 repeat packets was changed from the routing table 202 to the routing table 112.

Upon reception of the routing table reference destination change notice from the management module 101, the routing table reference destination change notice reception units 311 and 411 of the repeating modules 301 and 401 change the packet to be referred to when packets are repeated from the routing table 202 to the routing table 112.

The repeating process modules 301 and 401 determine the repeating destination of each packet in accordance with the routing table 112 of the management module 101, so that packets can be repeated and the communication resumes.

When a fault occurs in the route calculating module 201, the routing protocol process units 203 and 204 of the route calculating module 201 are inactive and the routing table 202 is not renewed.

As described above, when a fault occurs in the route calculating module 201, the management module 101 provides a substitute function for the route calculating module 201. It is therefore possible to provide with low cost an internetwork apparatus capable of operating even when a fault occurs in the route calculating module 201, without adding a new internetwork apparatus or a new route calculating module.

When a fault in the route calculating module 201 is recovered, the management module 101 notifies the repeating modules 301 and 401 of a change from the routing table 112 to the routing table 202, to thereby renew (form) the routing table 202.

The management module 101 manages various operations of each of the modules of the internetwork apparatus 11. Therefore, if the management module 101 provides all the substitute functions for the route calculating module 201, a load of the management module 101 becomes large. To avoid this, the management module 101 of the internetwork apparatus 11 of the embodiment may execute a degeneration operation substituting for the route calculating module 201. This degeneration operation, which omits some of the functions of the route calculating module 201, will be described next.

As an example of limitation of the type of a routing protocol, OSPF is used. In this case, the management module 101 does not substitute for the function of the routing protocol process unit 114 which processes OSPF. An operation of this process will be described.

FIG. 3 shows an example of the routing table 202 used during the normal operation by the embodiment. The configuration of the routing table 202 essentially includes only a destination 3020 and a next hop (next address) 3030. However, in this embodiment, it additionally includes an entry number 3010, a flag 3040 indicating whether or not the entry is valid, and a remark 3050.

It is assumed herein that the flag 3040 of "1" indicates the corresponding entry is valid and the flag 3040 of "0" indicates that the corresponding entry is invalid. The remark field 3050 indicates a protocol or protocols which formed the corresponding entry. As shown, the communication port 302 with the IP address "a" and the communication port 402 with the IP address "c" use RIP or OSPF, the communication port 303 with the IP address "b" uses RIP, and the communication port 403 with the IP address "d" uses OSPF.

In the route calculating module 201, the two process units operate including the routing protocol process unit 203 processing RIP and the routing protocol process unit 204 processing OSPF. The route calculations by the routing protocol process units 203 and 204 determine the IP address of the next hop of each of 3000 entries to form the routing table 202.

Figures 4, 5:
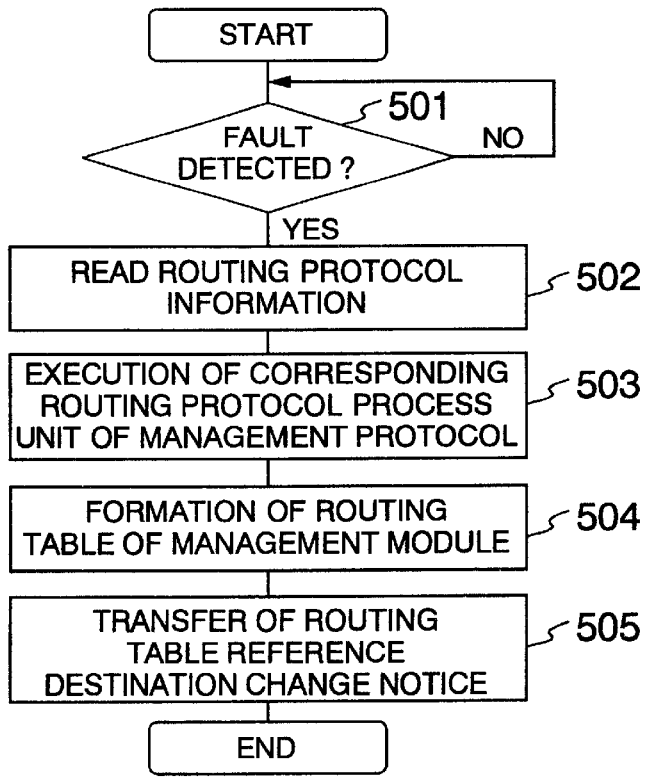
FIG. 4 shows an example of a routing table 112 during a degeneration operation limiting OSPF according to the embodiment shown in FIG. 1.
FIG. 5 is a flow chart illustrating a process during the degeneration operation limiting the type of a routing protocol according to the embodiment shown in FIG. 1.

After a fault occurs in the route calculating module 201, the management module 101 substitutes for the function of the route calculating module 201. FIG. 4 shows the contents of the routing table 112 used by the management module 101 which performs the degeneration operation limiting the routing protocol process unit 114 processing OSPF, after a fault occurs.

As shown in FIG. 4, the routing table 112 is renewed through route calculations by the routing protocol process unit 113 processing RIP. The remark field 4050 indicates that the communication ports 302, 303, and 402 use RIP.

The entry No. 4 for the network 4003 to be formed through route calculations of OSPF is an invalid entry because the routing protocol process unit 114 processing OSPF is limited. The flag field 4040 of the entry No. 4 shown in FIG. 4 is "0".

FIG. 5 is a flow chart illustrating the processes of the degeneration operation limiting the type of a routing protocol according to the embodiment. During the normal operation of the internetwork apparatus 11 of the embodiment, the repeating process modules 301 and 401 repeat packets in accordance with the routing table 202.

When a fault occurs in the route calculating module 201, the repeating modules 301 and 401 cannot refer to the routing table 202 so that packets cannot be repeated and communication halts.

At Step 501, the fault detecting process unit 102 of the management module 101 enquires the operation state of the route calculating module 201 and checks its response to judge whether any fault occurs.

If a fault of the route calculating module 201 is detected at Step 501, then at Step 502 the management module 101 reads the routing protocol information 104 to determine the type of a routing protocol process to be executed when the management module 101 substitutes for the function of the route calculating module 201.

At Step 503, the management module 101 activates only the process unit processing the determined routing protocol, e.g., the routing protocol process unit 113 processing RIP.

At Step 504 the management module 101 forms the routing table 112 shown in FIG. 4 with the help of the operation by the routing protocol process unit 113.

At Step 505 and following Steps, similar processes at Step 2040 and following Steps shown in FIG. 2 are executed.

The repeating process modules 301 and 401 determine the repeating destination of each packet in accordance with the routing table 112 of the management module 101, so that packets can be repeated and the communication resumes.

As described above, when the management module 101 of the internetwork apparatus 11 of the embodiment provides a substitute function, the routing protocol process unit 114 processing OSPF is not operated so that the process load of the management module 101 can be reduced.

In the above embodiment, although RIP and OSPF as IP routing protocols have been described by way of example, it is needless to say that IPX-RIP, RTMP and the like other than IP routing protocol may also be used.

Next, another degeneration operation will be described in which the number of ports is limited, for example, four ports during the normal operation is limited to three ports.

It is assumed herein that four communication ports 302, 303, 402, and 403 are operating during the normal operation. While the management module 101 substitutes for the function of the route calculating module 201, the management module 101 performs the degeneration operation in which the three communication ports 302, 303, and 403 operate and the communication port 402 does not operate.

Figures 6, 7:
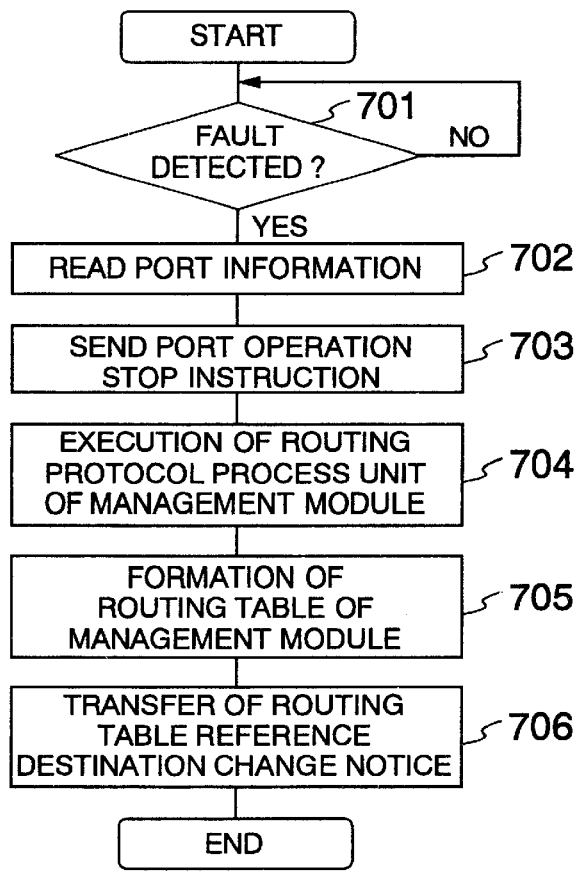
FIG. 6 shows an example of the routing table 112 during the degeneration operation limiting a communication port 402 according to the embodiment shown in FIG. 1.
FIG. 7 is a flow chart illustrating a process during the degeneration operation limiting the number of ports according to the embodiment shown in FIG. 1.

FIG. 6 shows an example of the routing table 112 during the degeneration operation limiting the communication port 402 according to the embodiment. The routing table 112 is renewed by the routing protocol process unit 113 processing RIP and the routing protocol process unit processing OSPF.

Since the communication ports 302, 303, and 403 operate and the communication port 402 does not operate, the entry having the next hop 6030 of "c" is invalid.

FIG. 7 is a flow chart illustrating the processes of the degeneration operation limiting the number of ports according to the embodiment. During the normal operation of the internetwork apparatus 11 of the embodiment, the repeating process modules 301 and 401 repeat packets in accordance with the routing table 202.

When a fault occurs in the route calculating module 201, the repeating modules 301 and 401 cannot refer to the routing table 202 so that packets cannot be repeated and communication halts.

At Step 701, the fault detecting process unit 102 of the management module 101 enquires the operation state of the route calculating module 201 and checks its response to judge whether any fault occurs.

If a fault of the route calculating module 201 is detected at Step 701, then at Step 702 the management module 101 reads the port information 105 to determine the ports (in this example, ports having the IP addresses "a", "b", and "c") which are used while the management module 101 substitutes for the function of the route calculating module 201.

Next, at Step 703 the management module 101 sends a port operation stop instruction for stopping the operation of the communication port determined not to be used, e.g., the communication port 402, to the repeating process module 401. Upon reception of the port operation stop instruction from the management module 101, the repeating process module 401 stops the operation of the communication port 402.

At Steps 704 to 706, similar processes at Steps 2020 to 2040 shown in FIG. 2 are executed.

The repeating process modules 301 and 401 receive packets from the ports in operation and determine the repeating destination of each packet in accordance with the routing table 112 of the management module 101, so that packets can be repeated and the communication resumes.

As described above, when the management module 101 of the internetwork apparatus 11 of the embodiment provides a substitute function, the number of ports to be operated is limited so that the process load of the management module 101 can be reduced.

In the above embodiment, the four ports in operation during the normal operation is limited to three ports during the degeneration operation. It is obvious that the number of ports to be limited can be set as desired. Although the operation of the communication port 402 is limited in the above example, the operations of other ports may obviously be limited.

Next, another degeneration operation will be described in which the number of entries of the routing table 112 is limited, for example, the maximum number of entries of the routing table 202 is set to 3000 entries during the normal operation, and to 1500 entries during the degeneration operation while the management module 101 substitutes for the function of the route calculating module 201.

Figures 8, 9:
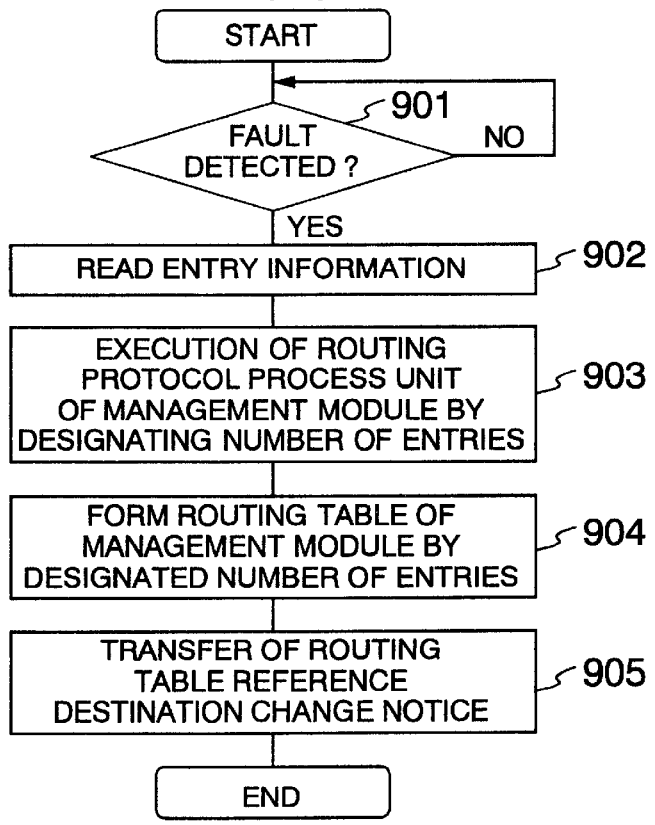
FIG. 8 shows an example of the routing table 112 during the degeneration operation limiting the number of entries according to the embodiment shown in FIG. 1.
FIG. 9 is a flow chart illustrating a process during the degeneration operation limiting the number of entries.

FIG. 8 shows an example of the routing table 112 during the degeneration operation limiting the number of entries according to the embodiment. While the management module 101 provides a substitute function, it executes the degeneration operation by limiting the number of entries of the routing table 112 as shown in FIG. 8. Since the number of entries of the routing table 112 is "1500", the routing entries having the entry No. 1501 or large are not formed.

FIG. 9 is a flow chart illustrating the processes of the degeneration operation limiting the number of entries according to the embodiment. During the normal operation of the internetwork apparatus 11 of the embodiment, the repeating process modules 301 and 401 repeat packets in accordance with the routing table 202.

When a fault occurs in the route calculating module 201, the repeating modules 301 and 401 cannot refer to the routing table 202 so that packets cannot be repeated and communication halts.

At Step 901, the fault detecting process unit 102 of the management module 101 enquires the operation state of the route calculating module 201 and checks its response to judge whether any fault occurs.

If a fault of the route calculating module 201 is detected at Step 901, then at Step 902 the management module 101 reads the entry information 106 (number "1500" is stored in this example) to determine the number of entries which is used while the management module 101 substitutes for the function of the route calculating module 201.

Next, at Step 903 the management module 101 designates the determined number of entries and activates the routing protocol process units 113 and 114. At Step 904 the management module 101 forms the routing table 112 limiting the number of entries, with the help of the operations by the routing protocol process units 113 and 114.

At Step 905 and following Steps, similar processes at Step 2040 and following Steps shown in FIG. 2 are executed.

The repeating process modules 301 and 401 determine the repeating destination of each packet in accordance with the routing table 112 of the management module 101, so that packets can be repeated and the communication resumes.

As described above, when the management module 101 of the internetwork apparatus 11 of the embodiment provides a substitute function, the number of entries of the routing table 112 is limited so that the process load of the management module 101 can be reduced.

In the above embodiment of the internetwork apparatus 11, although the maximum number of entries is set to "3000" during the normal operation and to "1500" during the degeneration operation, it is obvious that the maximum number of entries may be set to other values.

Next, another embodiment of the internetwork apparatus will be described in which a degeneration operation is executed in accordance with particular configuration definition information among a plurality piece of configuration definition information when a fault occurs in a route calculating module.

Figure 10:
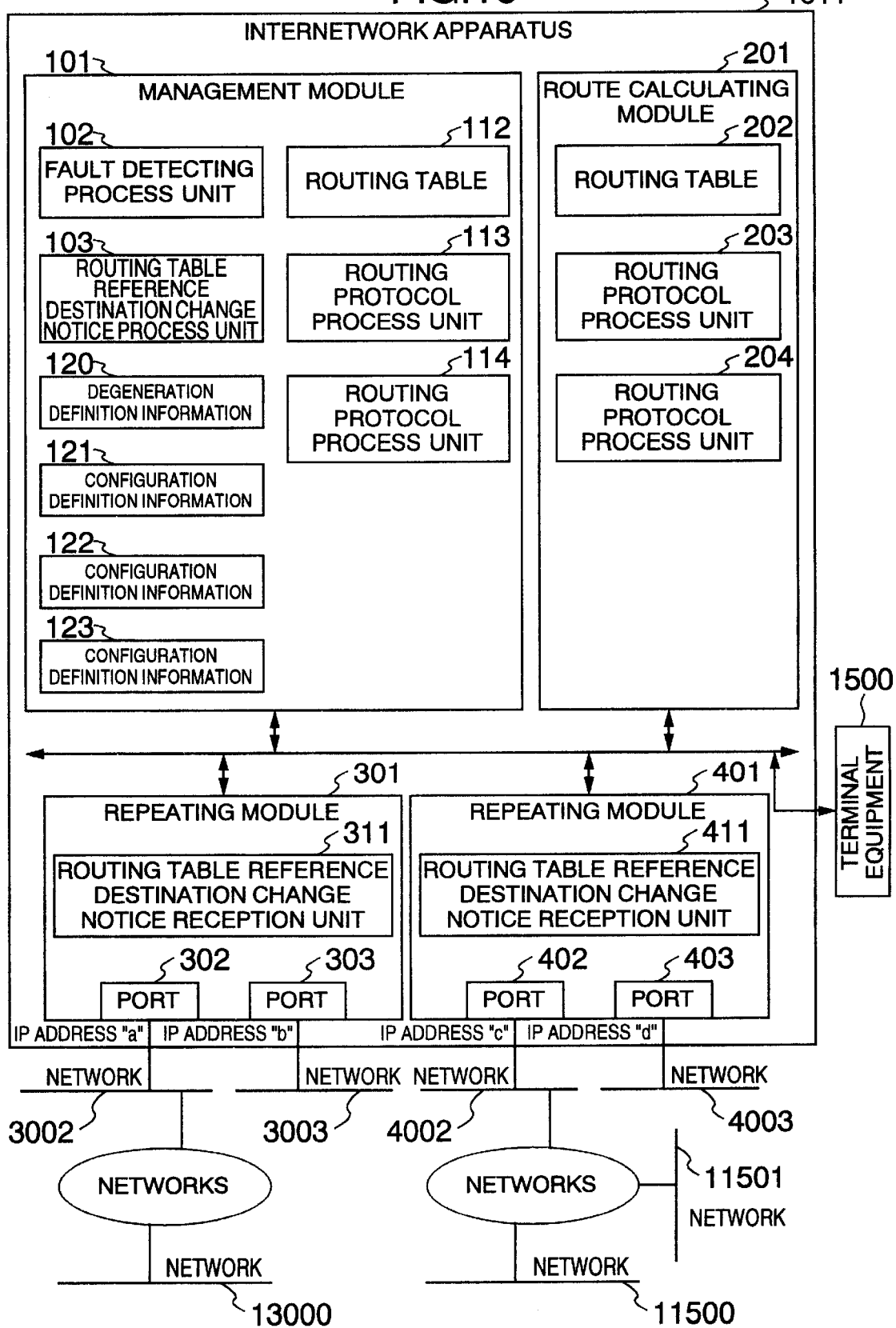
FIG. 10 is a diagram showing the outline structure of an internetwork apparatus according to another embodiment of the invention.

FIG. 10 is a diagram showing the outline structure of an internetwork apparatus 1011 of this embodiment. As shown, the internetwork apparatus 1011 of this embodiment has degeneration definition information 120, configuration definition information 121, configuration definition information 122, configuration definition information 123, and a terminal equipment 1500. In FIG. 10, elements having identical reference numerals to those of FIG. 1 are the same or equivalent elements.

The degeneration definition information 120 defines that the degeneration operation is automatically executed in accordance with the contents of the configuration definition information 122 when a fault occurs during the period from 8 AM to 8 PM in the route calculating module 201 and that the degeneration operation is automatically executed in accordance with the contents of the configuration definition information 123 when a fault occurs during the period other than the above-described period.

The configuration definition information 121 defines a ratio of IP packets to IPX packets during the normal operation (e.g., 50% IP packets and 50% IPX packets). The configuration definition information 122 defines that the number of IP packets is limited during the degeneration operation (e.g., 20% of IP packets and 80% or IPX packets) to repeat IPX packets with a priority over IP packets during the degeneration operation.

The configuration definition information 123 defines that the number of IPX packets is limited during the degeneration operation (e.g., 80% of IP packets and 20% or IPX packets) to repeat IP packets with a priority over IPX packets during the degeneration operation. The terminal equipment 1500 is used for designating the contents of the degeneration operation.

In the internetwork apparatus 1011 of this embodiment, the normal operation is executed in accordance with the configuration definition information 121. In the degeneration operation, for example, during the period from 8 AM to 8 PM corresponding to usual business hours, for example, customer data packets are repeated with a priority over other packets, in accordance with the configuration definition information 122. During the period other than the above-described period, for example, system maintenance data packets are repeated with a priority over other packets, in accordance with the configuration definition information 123.

In the following description of the internetwork apparatus 1011 of the embodiment, the customer data packet is represented by an IPX packet and the system maintenance data packet is represented by an IP packet.

Figure 11:
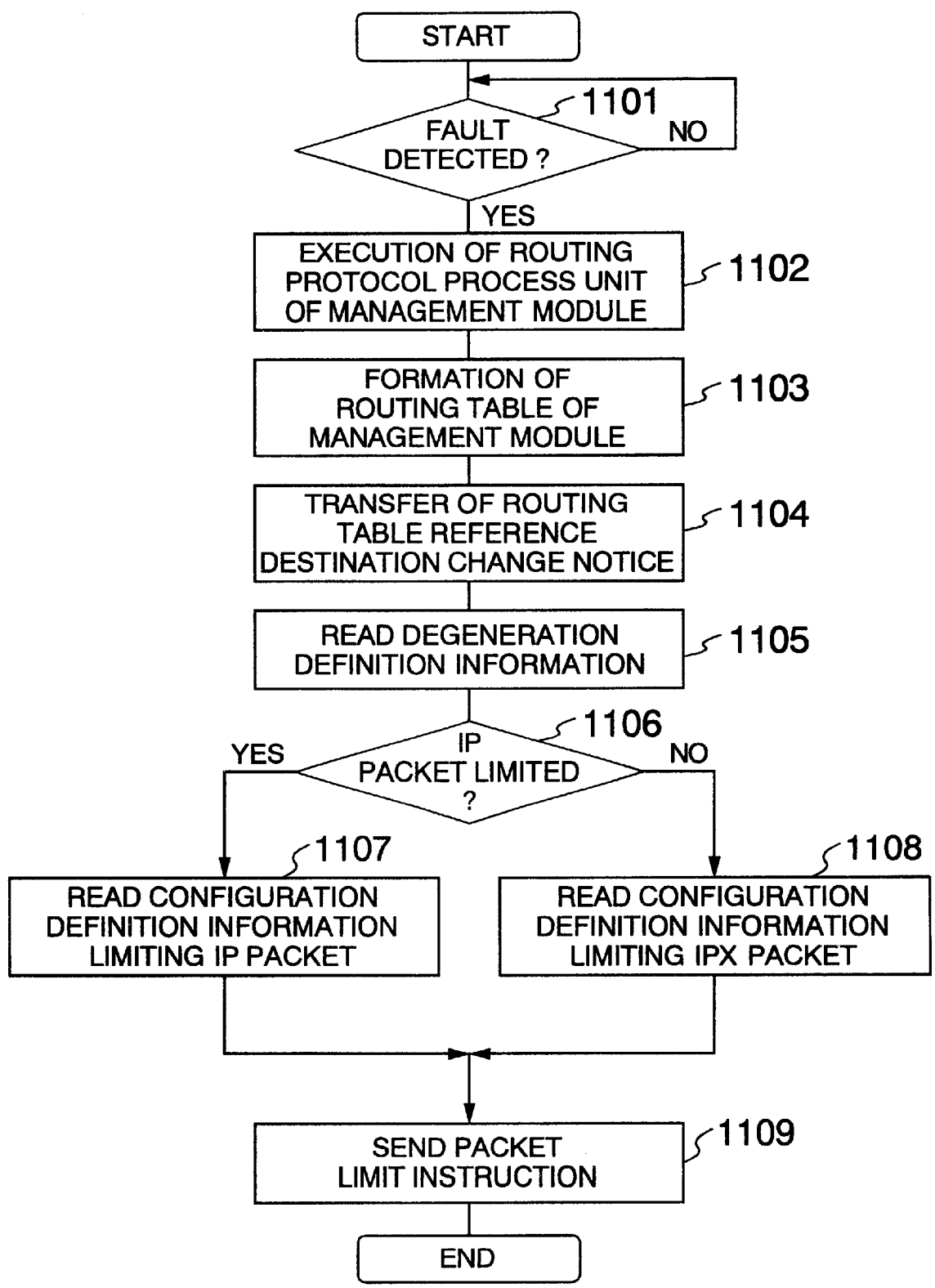
FIG. 11 is a flow chart illustrating a process to be executed by the internetwork apparatus shown in FIG. 10.

FIG. 11 is a flow chart illustrating the processes to be executed by the internetwork apparatus 1011 of this embodiment. For the normal operation of the internetwork apparatus 1011 of the invention, the management module 101 instructs the repeating process modules 301 and 401 to repeat packets at a ratio defined in the configuration definition information 121, and the repeating process modules 301 and 401 repeat packets in accordance with the routing table 202.

When a fault occurs in the route calculating module 201, the repeating modules 301 and 401 cannot refer to the routing table 202 so that packets cannot be repeated and communication halts.

At Steps 1101 to 1104, similar processes at Steps 2040 to 2040 shown in FIG. 2 are executed.

Next, at Step 1105 the management module 101 reads the degeneration definition information 120, and at Step 1106 a present time is compared with a time duration (in this example, from 8 AM to 8 PM) to judge whether it is now a time to limit the number of IP packets. In this example, IPX packets are used for customer data and IP packets are used for maintenance data. However, it is not limited only to this example.

If it is now the time to limit the number of IP packets (in this example, in the time period from 8 AM to 8 PM), the flow advances to Step 1107 to read the configuration definition information 122 defining the degeneration operation limiting the number of IP packets.

If it is not the time to limit the number of IP packets, the flow advances to Step 1108 to read the configuration definition information 123 defining the degeneration operation limiting the number of IPX packets.

Next, at Step 1109 the management module 101 sends a packet limit instruction to the repeating process modules 301 and 401, the packet limit instruction indicating a ratio of IP packets to IPX packets defined in the read configuration definition information 122 or 123.

Upon reception of the packet limit instruction from the management module 101, the repeating process modules 301 and 401 change a ratio of repeating packets for each type of protocols in accordance with the ratio indicated by the packet limit instruction.

The repeating process modules 301 and 401 determine the repeating destination of each packet in accordance with the routing table 112 of the management module 101, so that packets can be repeated and the communication resumes.

As described above, when the management module 101 of the internetwork apparatus 1011 of the embodiment provides a substitute function, repeating a particular packet is limited in accordance with the contents of the configuration definition information so that the process load of the management module 101 can be reduced.

The contents limited by the configuration definition information may be one of the type of routing protocols, the number of active ports, and the number of entries, or a combination thereof.

In the above embodiment, during the degeneration operation, customer data packets are repeated with a priority during the period from 8 AM to 8 PM, and system maintenance data packets are repeated with a priority during the period other than the above-described period. However, in an emergency, the degeneration operation may be manually switched to repeat system maintenance data packets irrespective of time, by designating the contents of the degeneration operation from the terminal equipment 1500. This can be achieved by manually rewriting the contents of at least one of the definition information 120 to 123.

Instead of automatically executing the degeneration operation, the degeneration operation may be executed only when the contents of the degeneration operation are manually entered from the terminal equipment 1500.

Another embodiment of the internetwork apparatus will be described in which the degeneration conditions are dynamically changed in accordance with the state of the degeneration operation of a management module.

Figure 12:
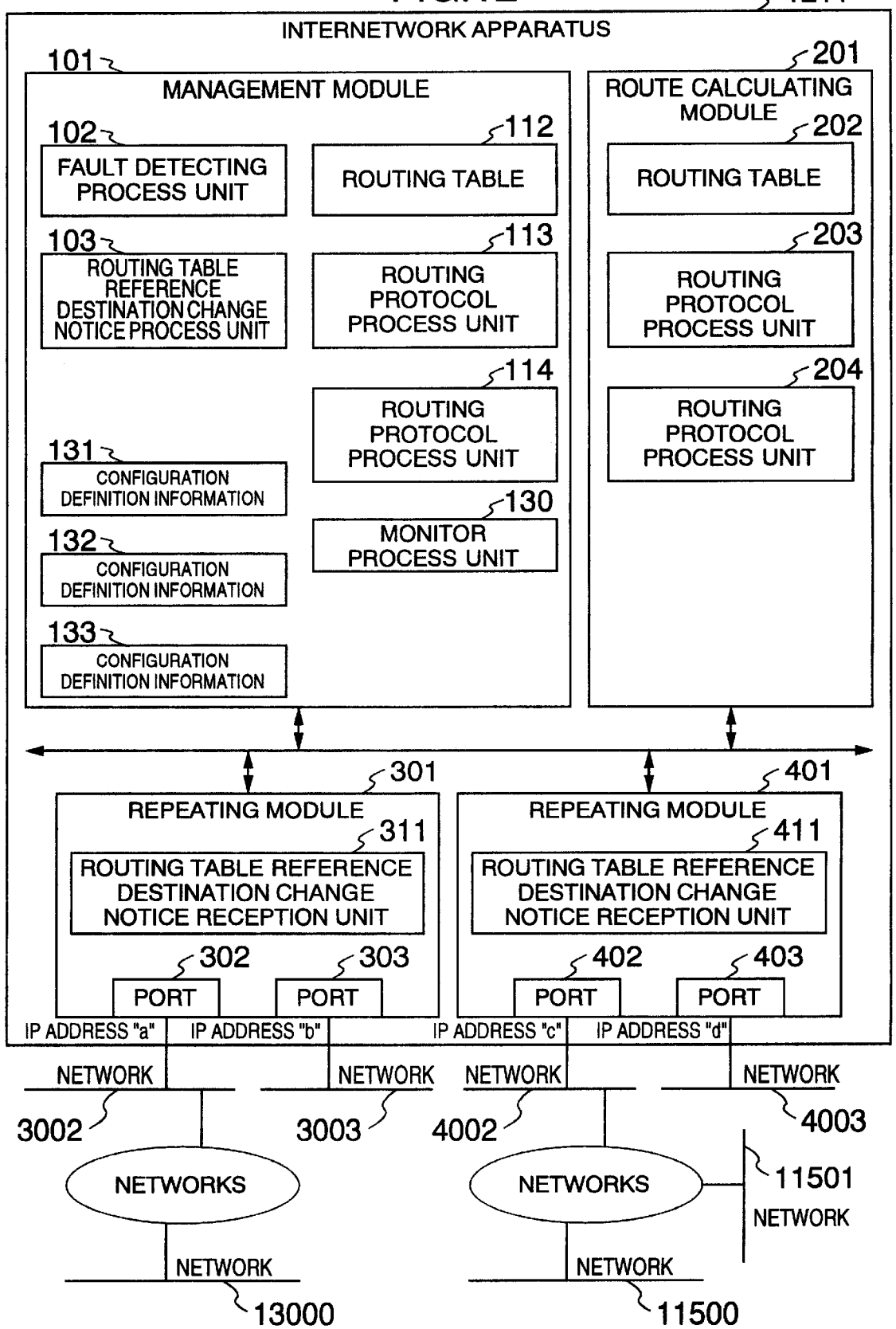
FIG. 12 is a diagram showing the outline structure of an internetwork apparatus according to a further embodiment of the invention.

FIG. 12 is a diagram showing the outline structure of an internetwork apparatus 1211 of this embodiment. As shown, the internetwork apparatus 1211 of this embodiment has a monitor process unit 130, configuration definition information 131, configuration definition information 132, and configuration definition information 133. In FIG. 12, elements having identical reference numerals to those of FIG. 1 are the same or equivalent elements.

The monitor process unit 130 monitors a CPU use rate of the management module 101. The configuration definition information 131 defines the routing protocol and the number of ports during the normal operation.

The configuration definition information 132 defines the degeneration operation limiting OSPF when the CPU use rate of the management module 101 is not over 50%. The configuration definition information 133 defines the degeneration operation limiting OSPF and limiting the number of active ports when the CPU use rate of the management module 101 is over 50%.

In the internetwork apparatus 1211 of this embodiment, the normal operation is performed in accordance with the configuration definition information 131, and when a fault occurs in the route calculating module 201, the management module 101 limits OSPF in accordance with the configuration definition information 132 to perform the degeneration operation.

After the degeneration operation continues for some period and when the CPU use rate of the management module 101 exceeds 50%, OSPF is limited and the number of active ports is reduced in accordance with the configuration definition information 133 to perform the degeneration operation.

Figure 13:
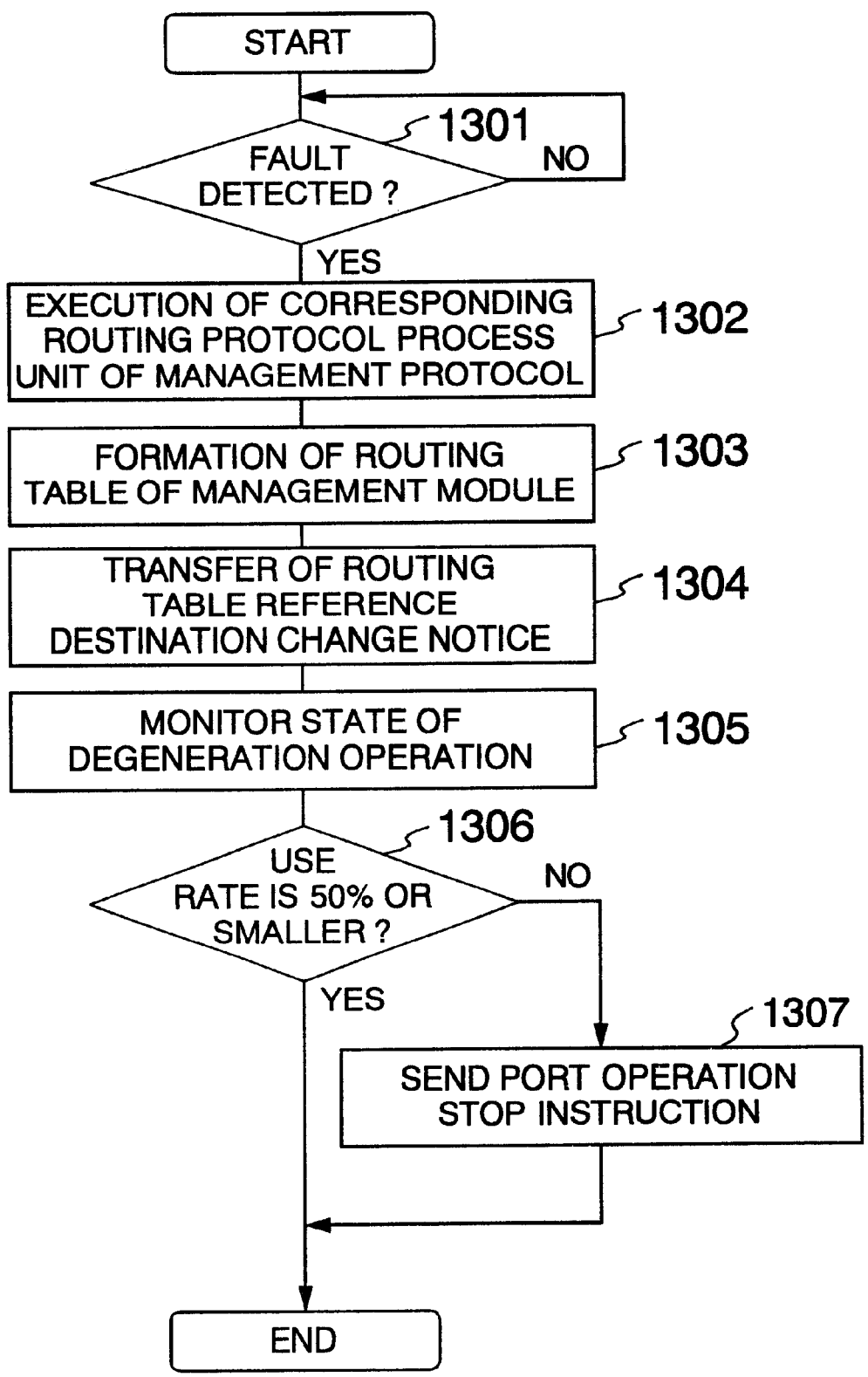
FIG. 13 is a flow chart illustrating a process to be executed by the internetwork apparatus shown in FIG. 12.

FIG. 13 is a flow chart illustrating the processes to be executed by the internetwork apparatus 1211 of the embodiment. During the normal operation of the internetwork apparatus 1211 of the embodiment, the management module 101 instructs the repeating modules 301 and 401 to perform routing with the routing protocol and the number of ports defined by the configuration definition information 131. The repeating modules 301 and 401 repeat packets in accordance with the routing table 202.

When a fault occurs in the route calculating module 201, the repeating modules 301 and 401 cannot refer to the routing table 202 so that packets cannot be repeated and communication halts.

At Step 1301, the fault detecting process unit 102 of the management module 101 enquires the operation state of the route calculating module 201 and checks its response to judge whether any fault occurs.

If a fault of the route calculating module 201 is detected at Step 1301, then at Step 1302 the management module 101 limits OSPF in accordance with the configuration definition information 132 and activates only the routing protocol process unit 113 processing RIP.

At Step 1303, the management module 101 forms the routing table 112 with the help of the operations of the routing protocol process unit 113 processing RIP.

At Step 1304, similar processes at Step 2040 shown in FIG. 2 are executed.

At Step 1305 the management module 101 makes the monitor process unit 130 check the CPU use rate during a specific time period. At Step 1306 it is checked whether the CPU use rate of the management module 101 is 50% or smaller.

If the CPU use rate of the management module 101 is not 50% or smaller, the flow advances to Step 1307 whereat the port whose operation is stopped is determined in accordance with the configuration definition information 133, and a port operation stop instruction is sent to the repeating process module 301 or 401.

Upon reception of the port operation stop instruction from the management module 101, the repeating process module 301 or 401 stops the operation of the port.

The repeating process modules 301 and 401 receive packets from active ports and determine the repeating destination of each packet in accordance with the routing table 112 of the management module 101, so that packets can be repeated and the communication resumes.

As described above, when the management module 101 of the internetwork apparatus 1211 of the embodiment provides a substitute function, the type of routing protocols and the number of active ports are limited in accordance with the CPU use rate of the management module 101 so that the process load of the management module 101 can be reduced.

In the internetwork apparatus 1211 of the embodiment, the degeneration conditions are dynamically changed in accordance with the CPU use rate of the management module 101. It is therefore possible to minimize the process functions to be degraded by the degeneration operation.

In the internetwork apparatus 1211 of the embodiment, although three configuration definitions are used, four or more configuration definitions may be used to dynamically change the degeneration conditions and perform the degeneration operation.

Also in the internetwork apparatus 1211 of the embodiment, a process unit for monitoring the CPU use rate of the management module 101 is used as the monitor process unit 130 for monitoring the state of the degeneration operation. Other process units for monitoring the state of the degeneration operation may also be used such as a process unit for monitoring the number of reception/transmission packets at each communication port and a process unit for monitoring the number of repeating packets.

Another embodiment of the internetwork apparatus will be described in which the degeneration operation is performed by giving a priority order to each of the process contents substituted by a management module.

Figure 14:
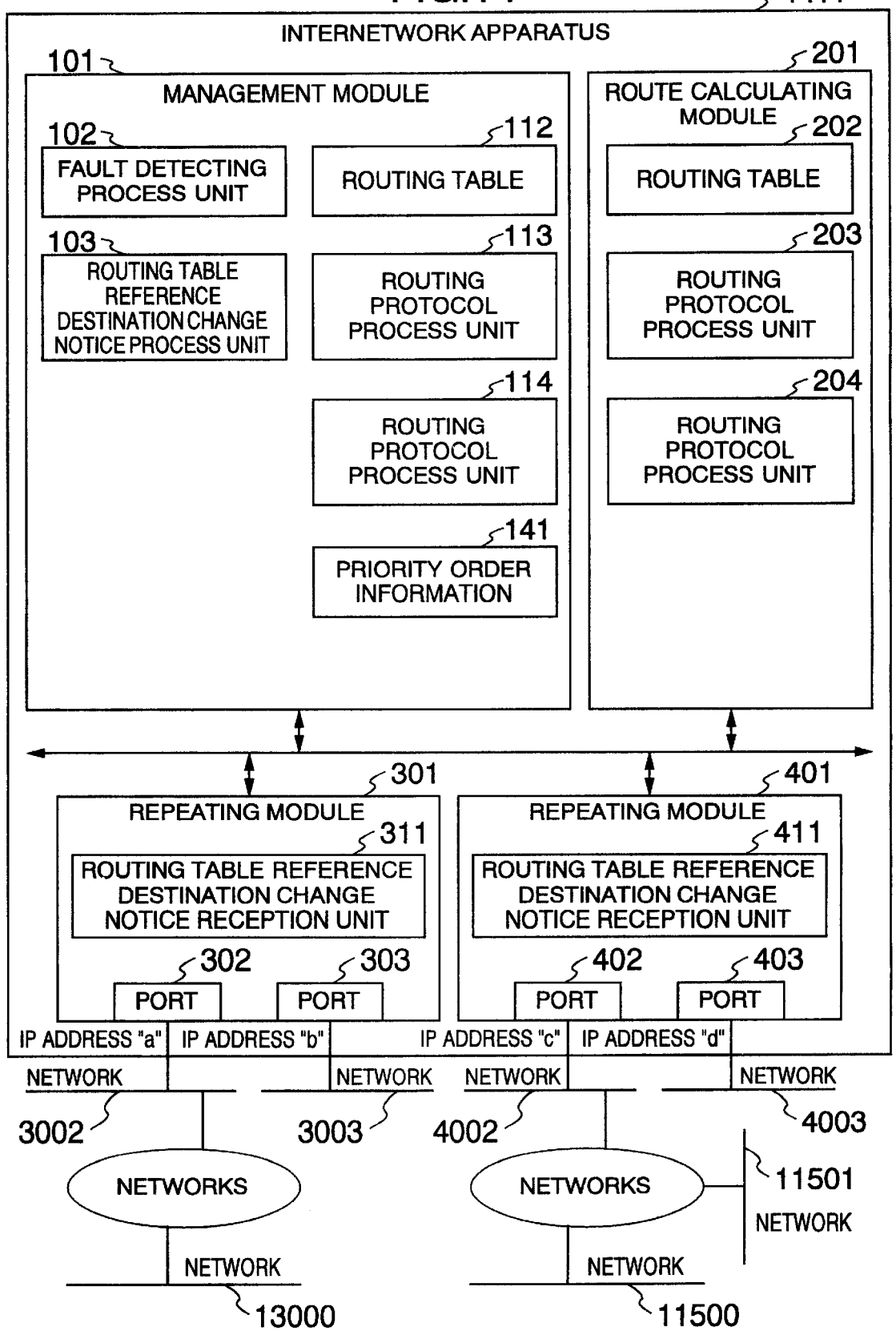
FIG. 14 is a diagram showing the outline structure of an internetwork apparatus according to a still further embodiment of the invention.

FIG. 14 is a diagram showing the outline structure of an internetwork apparatus 1411 of this embodiment. As shown, the internetwork apparatus 1411 of this embodiment has priority order information 141. In FIG. 14, elements having identical reference numerals to those of FIG. 1 are the same or equivalent elements. The priority order information 141 indicates a priority order of the routing protocol process units 113 and 112 during the degeneration operation.

In the following description, it is assumed that the protocol to be processed by the routing protocol process units 113 and 203 is RIP and the protocol to be processed by the routing protocol process units 114 and 204 is IPX-RIP.

Also in the description of the internetwork apparatus 1411 of this embodiment, the priority order values of "1" to "100" are used and the smaller the value, the higher the priority order is. It is assumed that during the normal operation, RIP and IPX-RIP both operate at the priority order of "20".

Figure 15:
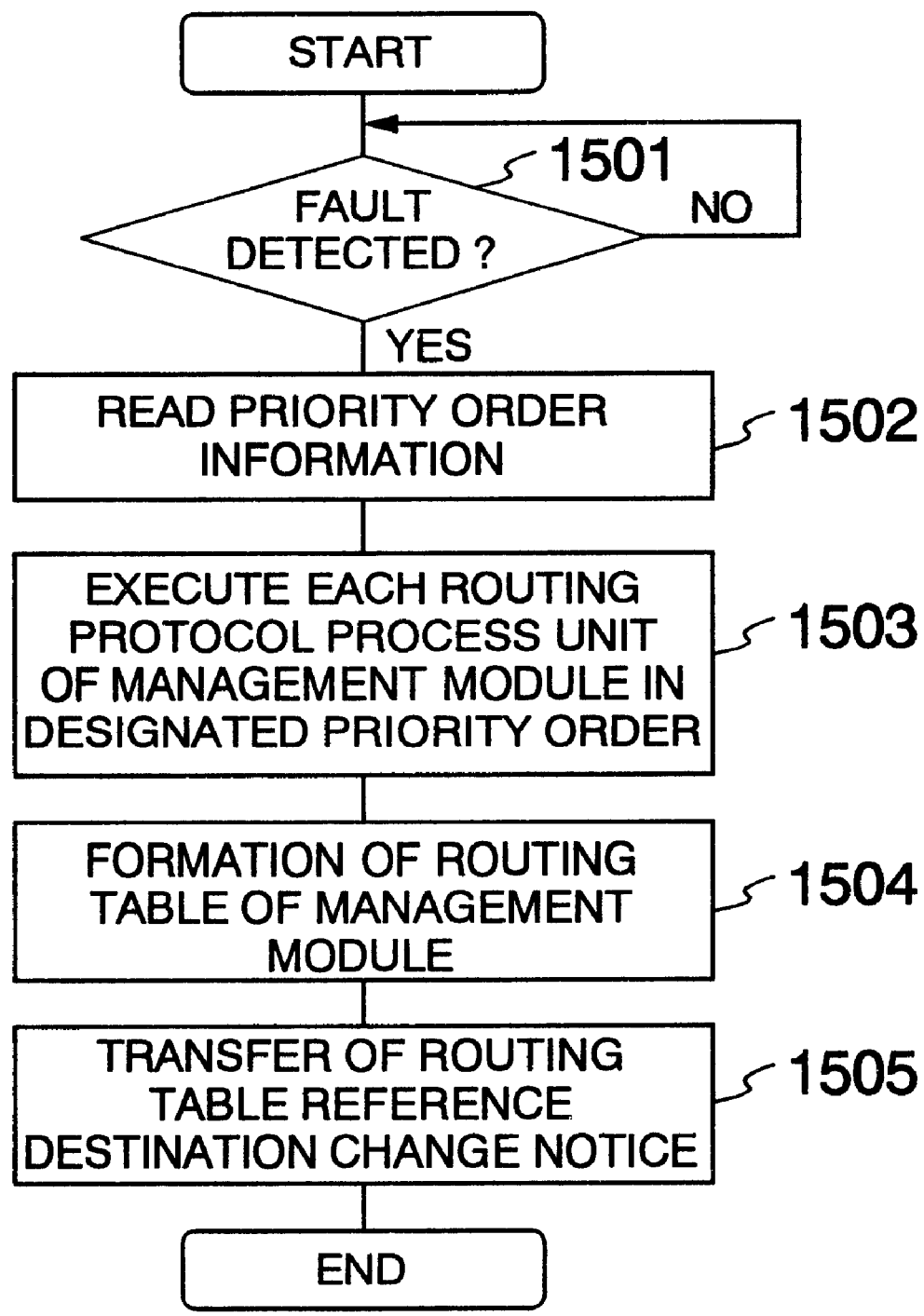
FIG. 15 is a flow chart illustrating a process to be executed by the internetwork apparatus shown in FIG. 14.

FIG. 15 is a flow chart illustrating the processes to be executed by the internetwork apparatus 1411 of the embodiment. During the normal operation of the internetwork apparatus 1411 of the embodiment, the management module 101 instructs the route calculating module 201 to process each routing protocol at the priority order of "20", and the repeating modules 301 and 401 repeat packets in accordance with the routing table 202.

When a fault occurs in the route calculating module 201, the repeating modules 301 and 401 cannot refer to the routing table 202 so that packets cannot be repeated and communication halts.

At Step 1501, the fault detecting process unit 102 of the management module 101 enquires the operation state of the route calculating module 201 and checks its response to judge whether any fault occurs.

If a fault of the route calculating module 201 is detected at Step 1501, then at Step 1502 the management module 101 reads the priority order information 141.

At Step 1503 the management module 101 activates the routing protocol process units 113 and 114 at specific priority orders defined by the read priority order information 141.

In accordance with the contents of the priority order information 141, the management module 101 raises the priority order of RIP by setting the priority order of "10" to the routing protocol process unit 113 processing RIP, and lowers the priority order of IPX-RIP by setting the priority order of "30" to the routing protocol process unit 114 processing IPX-RIP.

At Steps 1503 and 1504, similar processes at Steps 2030 and 2040 shown in FIG. 2 are executed.

As described above, when the management module 101 of the internetwork apparatus 1411 of the embodiment provides a substitute function, the priority orders of the routing protocol process units 113 and 114 are changed. Therefore, even under the conditions that a process is difficult to be executed normally, a specific routing protocol can be executed with a priority, e.g., RIP can be processed with a priority over IPX-RIP.

In the above description of the internetwork apparatus 1411 of the embodiment, RIP and IPX-RIP are used as the routing protocols. Other routing protocols may also be processed by the routing protocol process units 113 and 114.

The priority order of only the routing protocol process unit 113 processing RIP may be raised, the priority order of only the routing protocol process unit 114 processing IPX-RIP may be lowered, or the priority order may be manually changed easily without providing the priority order information 141.

In the embodiments described above, the management module 101 provides a substitute function for the route calculating module 201. Another module of the internetwork apparatus different from the route calculating module 201 may provide the substitute function.

Figure 16:
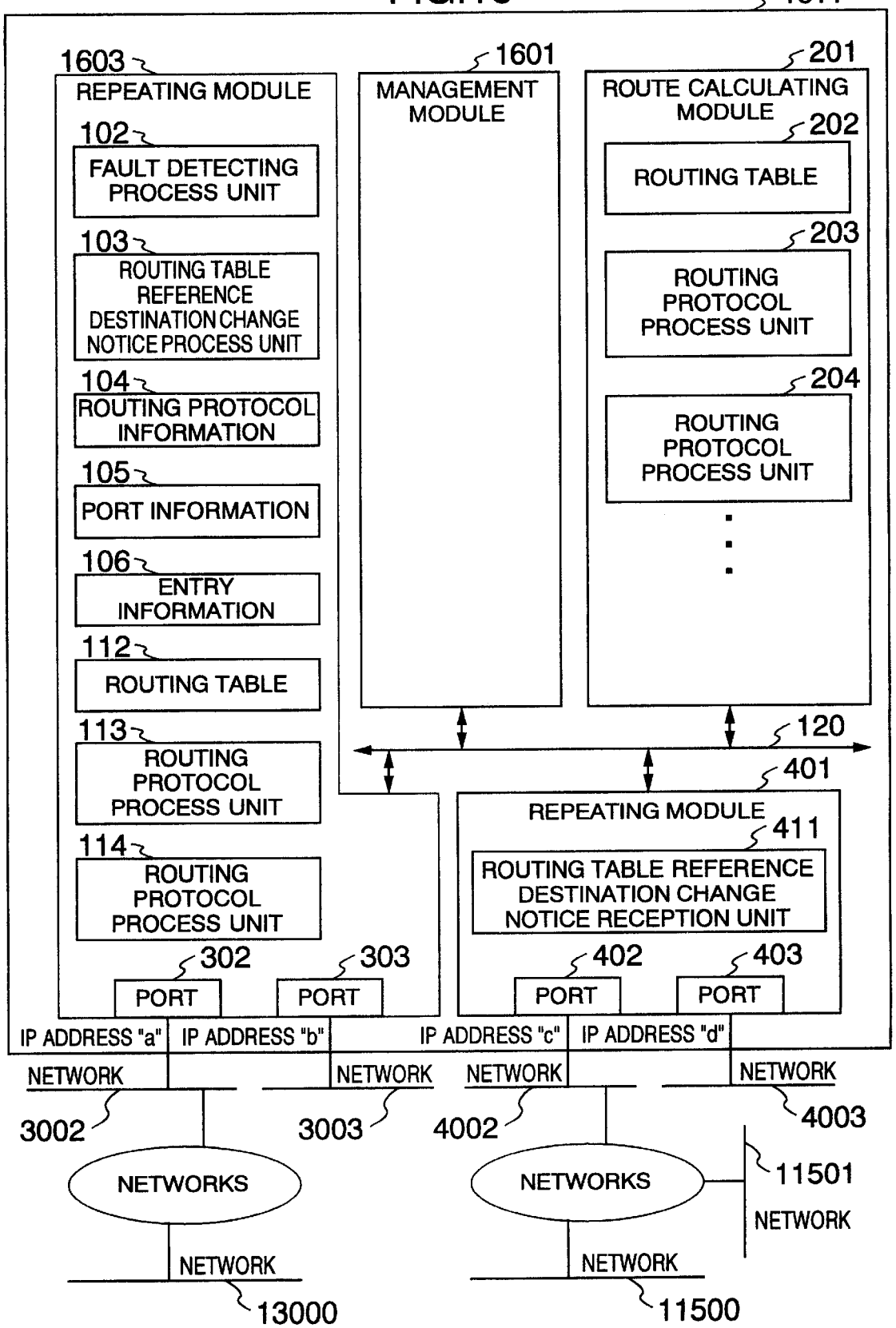
FIG. 16 is a diagram showing the outline structure of an internetwork apparatus according to another embodiment of the invention.

FIG. 16 is a diagram showing the outline structure of an internetwork apparatus in which a repeating process module provides the substitute function for the route calculating module 201. As shown, the internetwork apparatus 1611 of this embodiment has a management module 1601 and a repeating module 1603. In FIG. 16, elements having identical reference numerals to those of FIG. 1 are the same or equivalent elements.

The management module 1601 does not provide the substitute function for the route calculating module 201, but performs only its essential management process. The repeating module 1603 performs not only its essential repeating process but also provides the substitute function for the route calculating module 201 when a fault occurs in the route calculating module 201. Therefore, the repeating module 1601 has a fault detecting process unit 102, a routing table reference destination change notice process unit 103, routing protocol information 104, port information 105, entry information 106, a routing table 112, and routing protocol process units 113 and 114, similar to the management module 101 shown in FIG. 1. As compared to the repeating module 301 shown in FIG. 1, the repeating module 1603 is not provided with the routing table reference destination change notice reception unit 311. A process unit for performing essential repeating processes of the repeating modules 1603 and 401 is not directly relevant to the present invention, and so it is not shown.

The substitute processes for the route calculating module 201 to be executed by the repeating module 1603 when a fault occurs in the route calculating module 201 correspond to the processes in the flow chart shown in FIG. 2 to be executed not by the management module 101 but by the repeating module 1603 of this embodiment. However, at Step 2040 in FIG.2 the routing table reference destination change notice process unit 103 sends the reference destination change notice only to the repeating module 401. The routing table reference destination change notice process unit 103 of the repeating module 1603 repeats data packets on its ports 302 and 303 by controlling the ports 302 and 303, without sending the reference destination change notice to the repeating module 1603.

What is claimed is:

1. A route calculation execution method to be performed by an internetwork apparatus for interconnecting a plurality of networks having a route calculating module for calculating routes and a management module for managing a whole operation of the internetwork apparatus, the method comprising the steps of:

making route calculation be substituted by the management module in place of the route calculating module when a fault occurs in the route calculating module; and repeating packets in accordance with route calculation results made by the management module.

2. An internetwork apparatus interconnecting a plurality of networks, comprising:

a route calculating module having a first routing protocol process unit for calculating routes and a first routing table for storing route information obtained by the first routing protocol processing unit;

a management module for managing a whole operation of the internetwork apparatus, having a fault detecting process unit for detecting a fault in said route calculating module, a second routing protocol process unit for calculating routes when a fault occurs in said route calculating module, a second routing table for storing route information obtained by the second routing protocol process unit, and a routing table reference destination change notice process unit for notifying a repeating process module of a routing table reference destination change notice which indicates that the routing table, to be referred to when a repeating destination of a packet is determined, was changed; and the repeating process module, for receiving the routing table reference destination change notice from the routing table reference destination change notice process unit and changing the routing table to be referred to when a repeating destination of a packet is determined.

3. An internetwork apparatus according to claim 2, wherein said management module performs a degeneration operation in accordance with specific configuration definition information among a plurality piece of configuration definition information when a fault occurs in said route calculating module.

4. An internetwork apparatus according to claim 3, wherein said management module limits during the degeneration operation a type of routing protocols whose routes are calculated by said management module, when a fault occurs in said route calculating module.

5. An internetwork apparatus according to claim 3, wherein said management module limits during the degeneration operation a number of ports for transmitting/receiving packets when a fault occurs in said route calculating module.

6. An internetwork apparatus according to claim 4, wherein said management module limits during the degeneration operation a number of ports for transmitting/receiving packets when a fault occurs in said route calculating module.

7. A route calculation execution method to be performed by an internetwork apparatus having a route calculating module for performing a process of calculating routes of a data packet over a plurality of networks, the method comprising the steps of:

making the route calculation process be substituted not by the route calulating module but by another module different from the route calculating module of the internetwork apparatus, when a fault occurs in the route calculating module, wherein the other module is a management module for managing a whole operation of the internetwork apparatus;

forming by the management module a fault occurrence routing table when the fault occurs, the fault occurrence routing table storing for each data packet a name of a transmission port from which the data packet transmitting through the internetwork apparatus is transmitted;

notifying from the management module to a repeating module having a transmission port a reference destination of the fault occurrence routing table; and referring to by the repeating module the fault occurrence routing table and transmitting a relevant data packet from the transmission port.

8. A method according to claim 7, wherein the other module is a repeating module for performing a repeating process for the data packet transmitting through the internetwork apparatus, and the method further comprises the steps of:

forming by the repeating module a fault occurrence routing table when the fault occurs, the fault occurrence routing table storing for each data packet a name of a transmission port from which the data packet transmitting through the internetwork apparatus is transmitted; and referring to by the repeating module the fault occurrence routing table and transmitting a relevant data packet from the transmission port of the repeating module.

9. A method according to claim 8 further comprising the steps of:

notifying from the repeating module to another repeating module having a transmission port a reference destination of the fault occurrence routing table; and referring to by the other repeating module the fault occurrence routing table and transmitting a relevant data packet from the transmission port of the other repeating module.

10. A method according to claim 7, wherein the management module performs a degeneration operation, partially limiting the route calculating process by the route calculating module, as said substituting step.

11. A method according to claim 8, wherein the repeating module performs a degeneration operation, partially limiting the route calculating process by the route calculating module, as said substituting step.

12. An internetwork apparatus comprising:

a route calculating module for performing a process of calculating routes of a data packet over a plurality of networks;

another module different from said route calculating module for substituting for the route calculating process by the route calculating module, wherein the other module is a management module for managing a whole operation of the internetwork apparatus;

a repeating module having a transmission port and an internal bus for interconnecting the management module, the route calculating module, and the repeating module, wherein:

the management module includes a process unit for forming a fault occurrence routing table when a fault occurs, the fault occurrence routing table storing for each data packet a name of a transmission port from which the data packet transmitting through the internetwork apparatus is transmitted and a process unit for notifying from the management module to the repeating module having the transmission port a reference destination of the fault occurrence routing table; and the repeating module refers to the fault occurrence routing table and transmits a relevant data packet from the transmission port.

13. An internetwork apparatus according to claim 12, wherein the other module is a repeating module for performing a repeating process for the data packet transmitting through the internetwork apparatus, and the internetwork apparatus further comprises an internal bus interconnecting the route calculating module and the repeating module, wherein:

the repeating module includes a process unit for forming a fault occurrence routing table when the fault occurs, the fault occurrence routing table storing for each data packet a name of a transmission port from which the data packet transmitting through the internetwork apparatus is transmitted, and a process unit for referring to the fault occurrence routing table and transmitting a relevant data packet from a transmission port of the repeating module.

14. An internetwork apparatus according to claim 13, further comprising another repeating module having a transmission port connected to the internal bus, wherein:

the repeating module notifies the other repeating module of a reference destination of the fault occurrence routing table; and the other repeating module refers to the fault occurrence routing table and transmits a relevant data packet from the transmission port of the other repeating module.

15. An internetwork apparatus according to claim 12, wherein the management module performs a degeneration operation, partially limiting the route calculating process by the route calculating module, as the substituting process.

16. An internetwork apparatus according to claim 13, wherein the repeating module performs a degeneration operation, partially limiting the route calculating process by the route calculating module, as the substituting process.

17. A computer program product stored on a computer-readable medium to be executed by an internetwork apparatus having a route calculating module for performing a process of calculating routes of a data packet over a plurality of networks, the computer program product comprising a process part for making the route calculation process be substituted not by the route calculating module but by a management module of the internetwork apparatus which manages a whole operation of the internetwork apparatus, when a fault occurs in the route calculating module.

* * * * *